US010291956B2

(12) United States Patent
Zdepski et al.

(10) Patent No.: US 10,291,956 B2
(45) Date of Patent: May 14, 2019

(54) METHODS AND SYSTEMS FOR ENABLING COMMUNICATIONS BETWEEN DEVICES

(71) Applicant: Sonifi Solutions, Inc., Sioux Falls, SD (US)

(72) Inventors: Joel Walter Zdepski, Mountain View, CA (US); Shaun Eugene Marko, Oak Park, IL (US); Chad J. Schroeder, Sioux Falls, SD (US)

(73) Assignee: SONIFI SOLUTIONS, INC., Sioux Falls, SD (US)

( * ) Notice: Subject to any disclaimer, the term of this patent is extended or adjusted under 35 U.S.C. 154(b) by 0 days.

(21) Appl. No.: 15/282,676

(22) Filed: Sep. 30, 2016

(65) Prior Publication Data

US 2017/0094697 A1 Mar. 30, 2017

Related U.S. Application Data

(60) Provisional application No. 62/235,112, filed on Sep. 30, 2015, provisional application No. 62/245,146, filed on Oct. 22, 2015, provisional application No. 62/308,442, filed on Mar. 15, 2016.

(51) Int. Cl.
*H04W 8/00* (2009.01)
*H04L 29/06* (2006.01)
(Continued)

(52) U.S. Cl.
CPC ... *H04N 21/43637* (2013.01); *H04L 63/0457* (2013.01); *H04L 67/24* (2013.01);
(Continued)

(58) Field of Classification Search
CPC .............. H04L 63/18; H04N 21/4122; H04N 21/4126; H04N 21/42653; H04N 21/43637; H04N 5/44591
See application file for complete search history.

(56) References Cited

U.S. PATENT DOCUMENTS 4,198,870 A 4/1980 Barker et al.
4,564,732 A 1/1986 Lancaster et al.
(Continued)

FOREIGN PATENT DOCUMENTS

CA 2788573 11/2012
CA 2790354 3/2013
(Continued)

OTHER PUBLICATIONS

Erman et al. "Over the Top Video: The Gorilla in the Cellular Networks," IMC11, Nov. 24, 2011 [retrieved from the internet May 9, 2017 from URL: www.cs.columbia.edu/~lierranli/coms6998-7Spring2014/papers/videocellular_imc2011.pdf].
(Continued)

*Primary Examiner* — Ayaz R Sheikh
*Assistant Examiner* — Debebe A Asefa
(74) *Attorney, Agent, or Firm* — Sheridan Ross P.C.

(57) ABSTRACT

Methods and systems for selectively connecting a user device on a first network to a peripheral device on a second network are provided. More particularly, a communication server controls the peripheral devices that are visible to a user device in a discovery process. In addition, the communication server limits the peripheral devices that are available to a user device to those peripheral devices that the user device is authorized to access. The system further enables a user device to operably connect to a visible peripheral device.

19 Claims, 3 Drawing Sheets

(51) Int. Cl.

| | | |
|---|---|---|
| *H04L 29/08* | (2006.01) | |
| *H04N 21/41* | (2011.01) | |
| *H04N 21/44* | (2011.01) | |
| *H04N 21/81* | (2011.01) | |
| *H04W 48/18* | (2009.01) | |
| *H04W 76/11* | (2018.01) | |
| *H04W 76/16* | (2018.01) | |
| *H04W 84/12* | (2009.01) | |
| *H04N 21/214* | (2011.01) | |
| *H04N 21/436* | (2011.01) | |
| *H04N 21/4363* | (2011.01) | |
| *H04N 21/4627* | (2011.01) | |
| *H04N 21/6583* | (2011.01) | |

(52) U.S. Cl.
CPC ..... *H04N 21/2143* (2013.01); *H04N 21/4126* (2013.01); *H04N 21/43615* (2013.01); *H04N 21/44* (2013.01); *H04N 21/4627* (2013.01); *H04N 21/6583* (2013.01); *H04N 21/8186* (2013.01); *H04W 8/005* (2013.01); *H04W 48/18* (2013.01); *H04W 76/11* (2018.02); *H04W 76/16* (2018.02); *H04L 2463/101* (2013.01); *H04W 84/12* (2013.01)

(56) References Cited

U.S. PATENT DOCUMENTS

| | | |
|---|---|---|
| 5,374,952 A | 12/1994 | Flohr |
| 5,455,619 A | 10/1995 | Truckenmiller et al. |
| 5,506,572 A | 4/1996 | Hills et al. |
| 5,641,319 A | 6/1997 | Stoel et al. |
| 5,675,828 A | 10/1997 | Stoel et al. |
| 5,905,942 A | 5/1999 | Stoel et al. |
| 5,907,715 A | 5/1999 | Stoel et al. |
| 6,226,677 B1 | 5/2001 | Slemmer |
| 6,240,533 B1 | 5/2001 | Slemmer |
| 6,343,315 B1 | 1/2002 | Stoel et al. |
| 6,377,990 B1 | 4/2002 | Slemmer et al. |
| 6,594,692 B1 * | 7/2003 | Reisman .............. G06F 8/65 705/26.1 |
| 7,272,844 B1 | 9/2007 | Bankers et al. |
| 7,380,031 B2 | 5/2008 | Jones et al. |
| 7,444,663 B2 | 10/2008 | Fenwick, Jr. et al. |
| 7,895,630 B2 | 2/2011 | McKenna et al. |
| 7,930,721 B1 | 4/2011 | Hernes |
| 7,971,782 B1 | 7/2011 | Shams |
| 8,214,429 B2 | 7/2012 | Chide et al. |
| 8,356,251 B2 | 1/2013 | Strober |
| 8,434,111 B2 | 4/2013 | Levy et al. |
| 8,572,662 B2 | 10/2013 | Cassidy et al. |
| 8,578,418 B2 | 11/2013 | Levy et al. |
| 8,713,612 B2 | 4/2014 | Levy et al. |
| 8,732,753 B2 | 5/2014 | Warrick |
| 8,854,195 B2 | 10/2014 | West et al. |
| 8,903,978 B2 | 12/2014 | Zerr et al. |
| 9,032,451 B2 | 5/2015 | Cansino et al. |
| 9,107,055 B2 | 8/2015 | Zerr et al. |
| 9,326,095 B2 | 4/2016 | Yu et al. |
| 9,369,829 B2 | 6/2016 | Zerr et al. |
| 2002/0052965 A1 | 5/2002 | Dowling |
| 2003/0090386 A1 | 5/2003 | Giraldin et al. |
| 2003/0229900 A1 | 12/2003 | Reisman |
| 2004/0261110 A1 | 12/2004 | Kolbeck et al. |
| 2005/0283791 A1 | 12/2005 | McCarthy et al. |
| 2006/0107299 A1 | 5/2006 | Bartfeld et al. |
| 2006/0117379 A1 | 6/2006 | Bennett et al. |
| 2006/0123053 A1 | 6/2006 | Scannell, Jr. |
| 2006/0153122 A1 | 7/2006 | Hinman et al. |
| 2006/0277312 A1 | 12/2006 | Hirsch |
| 2007/0080934 A1 | 4/2007 | Chen et al. |
| 2007/0155326 A1 | 7/2007 | Lin et al. |
| 2007/0157281 A1 | 7/2007 | Ellis et al. |
| 2008/0060081 A1 | 3/2008 | Van Den Heuvel |
| 2008/0130595 A1 | 6/2008 | Abdel-Kader |
| 2008/0141313 A1 | 6/2008 | Kato et al. |
| 2008/0151847 A1 * | 6/2008 | Abujbara ............ H04L 63/0892 370/338 |
| 2008/0168129 A1 | 7/2008 | Robbin et al. |
| 2008/0207170 A1 * | 8/2008 | Khetawat ............ H04W 60/005 455/411 |
| 2009/0007240 A1 | 1/2009 | Vantalon et al. |
| 2009/0083824 A1 | 3/2009 | McCarthy et al. |
| 2009/0125971 A1 | 5/2009 | Belz et al. |
| 2009/0144815 A1 | 6/2009 | Vrielink et al. |
| 2009/0158404 A1 | 6/2009 | Hahn et al. |
| 2009/0172780 A1 | 7/2009 | Sukeda et al. |
| 2010/0058485 A1 | 3/2010 | Gonzalez et al. |
| 2010/0069115 A1 | 3/2010 | Liu |
| 2010/0070997 A1 | 3/2010 | Friedman |
| 2010/0145859 A1 | 6/2010 | Murakami et al. |
| 2010/0162294 A1 | 6/2010 | Yin et al. |
| 2010/0165879 A1 | 7/2010 | Gupta et al. |
| 2010/0176919 A1 | 7/2010 | Myers et al. |
| 2010/0278345 A1 | 11/2010 | Alsina et al. |
| 2010/0330979 A1 | 12/2010 | Harris |
| 2011/0099598 A1 | 4/2011 | Shin et al. |
| 2011/0116452 A1 | 5/2011 | Welch et al. |
| 2011/0167486 A1 | 7/2011 | Ayloo et al. |
| 2011/0244829 A1 | 10/2011 | Kase |
| 2011/0290893 A1 | 12/2011 | Steinberg |
| 2011/0314497 A1 | 12/2011 | Warrick et al. |
| 2012/0027374 A1 | 2/2012 | Lipkind |
| 2012/0072951 A1 | 3/2012 | King |
| 2012/0075538 A1 | 3/2012 | Okuda |
| 2012/0096503 A1 | 4/2012 | Slothouber et al. |
| 2012/0159472 A1 | 6/2012 | Hong et al. |
| 2012/0159538 A1 | 6/2012 | Phillips et al. |
| 2012/0166628 A1 | 6/2012 | Kullos |
| 2012/0166655 A1 | 6/2012 | Maddali et al. |
| 2012/0243444 A1 | 9/2012 | Hillier et al. |
| 2012/0249890 A1 | 10/2012 | Chardon et al. |
| 2012/0260268 A1 | 10/2012 | Mirkin |
| 2012/0272147 A1 | 10/2012 | Strober |
| 2013/0051237 A1 | 2/2013 | Ong |
| 2013/0081093 A1 | 3/2013 | Cassidy et al. |
| 2013/0091309 A1 | 4/2013 | Bjontegard et al. |
| 2013/0097286 A1 | 4/2013 | Robbin et al. |
| 2013/0124759 A1 | 5/2013 | Strober |
| 2013/0142181 A1 | 6/2013 | Makim et al. |
| 2013/0239199 A1 | 9/2013 | Ong |
| 2013/0297723 A1 | 11/2013 | Iwaniszyn |
| 2013/0298020 A1 | 11/2013 | Stoikos |
| 2013/0305320 A1 | 11/2013 | Warrick et al. |
| 2013/0305341 A1 | 11/2013 | Baker et al. |
| 2013/0339533 A1 | 12/2013 | Neerinex et al. |
| 2013/0339865 A1 | 12/2013 | Oslund et al. |
| 2013/0346564 A1 | 12/2013 | Warrick et al. |
| 2013/0346808 A1 | 12/2013 | Gyorffy |
| 2013/0347028 A1 | 12/2013 | Warrick et al. |
| 2014/0026162 A1 | 1/2014 | Cassidy et al. |
| 2014/0051362 A1 | 2/2014 | Ding |
| 2014/0053246 A1 | 2/2014 | Huang et al. |
| 2014/0053282 A1 | 2/2014 | Court |
| 2014/0067828 A1 | 3/2014 | Archibong et al. |
| 2014/0089524 A1 | 3/2014 | Carriere |
| 2014/0090030 A1 | 3/2014 | Ong |
| 2014/0114919 A1 | 4/2014 | Woods |
| 2014/0143380 A1 | 5/2014 | Warrick et al. |
| 2014/0150031 A1 | 5/2014 | Kumar et al. |
| 2014/0189758 A1 | 7/2014 | Kozlowski |
| 2014/0189759 A1 | 7/2014 | Warrick et al. |
| 2014/0245395 A1 | 8/2014 | Hulse et al. |
| 2014/0250460 A1 | 9/2014 | Hulse et al. |
| 2014/0250470 A1 | 9/2014 | Warrick |
| 2014/0282751 A1 | 9/2014 | Lee et al. |
| 2014/0282921 A1 | 9/2014 | Filman et al. |
| 2014/0289410 A1 | 9/2014 | Smith et al. |
| 2014/0304722 A1 | 10/2014 | Ostlund |
| 2014/0331135 A1 | 11/2014 | Sukoff et al. |
| 2014/0347181 A1 | 11/2014 | Luna et al. |
| 2015/0147972 A1 | 5/2015 | Motto |
| 2015/0339274 A1 | 11/2015 | Pappu et al. |

(56) References Cited

U.S. PATENT DOCUMENTS

| | | |
|---|---|---|
| 2015/0350690 A1 | 12/2015 | Zerr et al. |
| 2015/0365512 A1 | 12/2015 | MacKenzi et al. |
| 2015/0373401 A1 | 12/2015 | Kwon et al. |
| 2015/0382195 A1 | 12/2015 | Grim et al. |
| 2016/0027399 A1 | 1/2016 | Wilde et al. |
| 2016/0073440 A1 | 3/2016 | Palten et al. |
| 2016/0249158 A1 | 8/2016 | Tredoux et al. |
| 2016/0255461 A1 | 9/2016 | Zerr et al. |
| 2016/0285877 A1 | 9/2016 | Anderson et al. |
| 2017/0206593 A1 | 7/2017 | Zolotov |
| 2017/0272819 A1 | 9/2017 | Zerr et al. |
| 2018/0070200 A1 | 3/2018 | Zerr et al. |

FOREIGN PATENT DOCUMENTS

| | | |
|---|---|---|
| CA | 2817932 | 12/2013 |
| CA | 2820654 | 12/2013 |
| CN | 203590374 | 5/2014 |
| EP | 0094839 | 11/1983 |
| WO | WO 2007/002604 | 1/2007 |
| WO | WO 2009/137247 | 11/2009 |
| WO | WO 2012/145227 | 10/2012 |

OTHER PUBLICATIONS

Montpetit et al. "IPTV: An End to End Perspective," Journal of Communications, May 2010, vol. 5, No. 5, pp. 358-373.
Xia et al. "A Survey on Software-Defined Networking," IEEE Communication Surveys & Tutorials, First Quarter 2015, vol. 17, No. 1, pp. 27-51.
Official Action for U.S. Appl. No. 15/282,556, dated Jul. 24, 2017, 20 pages.
International Search Report and Written Opinion for International (PCT) Patent Application No. PCT/US16/54987, dated Feb. 21, 2017, 12 pages.
International Search Report and Written Opinion for International (PCT) Patent Application No. PCT/US16/54876, dated Dec. 29, 2016, 8 pages.
U.S. Appl. No. 14/503,858, filed Oct. 1, 2014, Zerr et al.
U.S. Appl. No. 15/144492, filed May 2, 2016, Anderson et al.
U.S. Appl. No. 15/282556, filed Sep. 30, 2016, Zerr et al.
"Specification of the Bluetooth® System Version 4.2. Manual," Bluetooth SIG, Inc., Dec. 2014, 40 pages [retrieved on May 21, 2016 from https://www.bluetooth.com/specifications/adopted-specifications].
"DIAL Discovery and Launch protocol specification," Netflix, Inc., 2012, Version 1.6.4, 16 pages.
Official Action for U.S. Appl. No. 15/282,556, dated Feb. 7, 2018 20 pages.
International Preliminary Report on Patentability for International (PCT) Patent Application No. PCT/US2016/054897, dated Apr. 12, 2018 9 pages.
International Preliminary Report on Patentability for International (PCT) Patent Application No. PCT/US2016/054876, dated Apr. 12, 2018 7 pages.
Official Action for U.S. Appl. No. 15/282,556, dated Aug. 1, 2018 21 pages.
Official Action for U.S. Appl. No. 15/282,556, dated Jan. 14, 2019 21 pages.
"Commercial Requirements for Companion Screen in the DVB-GEM Specification," DVB Organization, Apr. 2013, Version R 6.9.1, 40 pages.
"Dial: Discovery and Launch protocol specification," Netflix, Inc., 2015, Version 1.7.2, 30 pages.
Extended Search Report for European Patent Application No. 16852750.5, dated Nov. 19, 2018 11 pages.

* cited by examiner

METHODS AND SYSTEMS FOR ENABLING COMMUNICATIONS BETWEEN DEVICES

CROSS-REFERENCE TO RELATED APPLICATIONS

This application claims the benefit of U.S. Provisional Patent Application Ser. No. 62/235,112, filed Sep. 30, 2015, U.S. Provisional Patent Application Ser. No. 62/245,146, filed Oct. 22, 2015, and U.S. Provisional Patent Application Ser. No. 62/308,442, filed Mar. 15, 2016, the entire disclosures of each of which are hereby incorporated herein by reference in their entirety.

FIELD

Systems and methods for selective connecting a user device to a peripheral device are provided.

BACKGROUND

Increasingly, digital networks are used for communication and entertainment purposes. As the use of digital networks has become more common, the need to conveniently and securely connect devices to such networks has increased. For example, in a hospitality setting, such as a hotel or conference, it is desirable to allow guests and conference participants to make use of digital networks at the hotel or other host facility. For example, it is desirable to allow user devices, such as smart phones, tablet computers, or laptop computers, to make use of facility networks in order to access the Internet. In addition, it is desirable to allow user devices to utilize facility peripheral devices, such as printers, scanners, projectors, or other peripherals. However, it is important to control access by user devices to ensure security of information, and to ensure that only authorized devices are granted access to the facility resources. In particular, in many hospitality settings, device isolation, which prevents user devices from discovering other devices, is a requirement. For example, where device isolation is in effect, Wi-Fi clients are restricted from seeing other Wi-Fi devices. The requirement of device isolation thus conflicts with the desire to allow a user device to discover and make use of other Wi-Fi devices in the vicinity of the user device. In addition, previous systems have lacked a way to connect devices on different sub-networks or nodes.

In many hotels and conference centers, business or guest services facilities are available for use by guests. These often require the user to provide a portable storage device, such as a universal serial bus (USB) memory device, in order to transfer files between the user's device and the peripheral device. As an alternative, a direct wireline (e.g. USB connector) or wireless (e.g. Bluetooth) connection can be established between the user device and the peripheral. These mechanisms have the disadvantage of requiring direct physical access or proximity to the peripheral device by the user. As yet another alternative, peripheral devices may be made available through a local area network (LAN), or intranet, directly or through indirect means, such as email. However, the use of a network connection can be relatively insecure. In addition, all of these techniques are relatively inconvenient.

In order to address security concerns, while removing the need for direct physical access to or proximity with the peripheral device, such devices can be accessed over a virtual local area network (VLAN). However, establishing a VLAN for individual users or groups of users can require a large amount of system overhead. In addition, making use of a VLAN can require that relatively complex steps be taken by each user and the facility.

SUMMARY

Embodiments of the present disclosure are directed to systems and methods that enable users to flexibly, conveniently, and securely connect personal devices to peripheral devices. Examples of personal devices, also referred to herein as user devices, include but are not limited to smart phones, tablet computers, and laptop computers. Examples of peripheral devices, also referred to herein as facility devices, include but are not limited to printers, scanners, projectors, televisions, audio systems, and Internet access points. More particularly, a communication server or network controller is provided to manage lists of user devices and peripheral devices, and to control the visibility and operative access of the various devices to one another.

In accordance with at least some embodiments of the present disclosure, a user device can be connected to a peripheral device selected from a constrained or controlled set of peripheral devices. In accordance with embodiments of the current disclosure, the communication server can provide functions that enable a user device to operably connect to a communication system, such as a local area network. In addition, the communication server can control which of the peripheral devices that are visible to the user device. Moreover, the communication server can present a constrained set of peripheral devices to the user device that the user can make a selection from to operably connect a user device to the selected peripheral device.

After a connection is established, the user can operate the user device to control a connected peripheral device. In accordance with at least some embodiments of the present disclosure, user devices communicate with the communication server over a first network, while peripheral devices communicate with the communication server over a second network. In such embodiments, the communication server acts as a bridge between the networks with respect to a user device and a peripheral device that are authorized to pass information, such as data or control information, between one another. In a typical implementation, different user devices with different authorizations or credentials are presented with different lists of available peripheral devices. Moreover, the lists of available peripheral devices may be generated or administered by the communication server dynamically, based on various criteria, such as but not limited to relative location of the user device and a peripheral device, access credentials held by a user of the user device, conference participation status, subscription level, registered room, or the like.

Accordingly, embodiments of the present disclosure control the peripheral devices that are visible to a user device. In addition, embodiments of the present disclosure provide a dynamically enabled bridge between user devices on a first network and peripheral devices on a second network. In general, different user devices can be presented with different lists of available peripheral devices. In at least some embodiments or implementations, the list of peripheral devices available to a first user device can at least partially overlap with the list of peripheral devices available to a second user device. In addition, a user device can have access to multiple peripheral devices, including simultaneous access to multiple peripheral devices.

In accordance with further embodiments of the present disclosure, the communication server can provide additional features or constraints that are applied is association with the use of a peripheral device by a user device. Such features and constraints can include providing a user interface to the user device, implementing a pay wall and/or applying per use charges for access to peripheral devices.

Methods in accordance with embodiments of the present disclosure include providing a communication or network controller server operable to selectively enable a user device to operatively connect to one or more peripheral devices selected from a plurality of peripheral devices. The devices can be assigned to a user device on an ad hoc basis. In addition, the network controller server can operate as a bridge between a first network to which the user device is connected, and a second network to which the peripheral device or devices is connected. In accordance with at least some embodiments of the present disclosure, after association of a user device with a peripheral device, the user device can provide data to, receive data from, or exchange data with the peripheral device. In accordance with further embodiments of the present disclosure, the user device can also perform command and control operations with respect to a connected peripheral device.

Additional advantages and features of embodiments of the present disclosure will become more readily apparent from the following description, particularly when considered together with the accompanying drawings.

DETAILED DESCRIPTION

Figure 1:
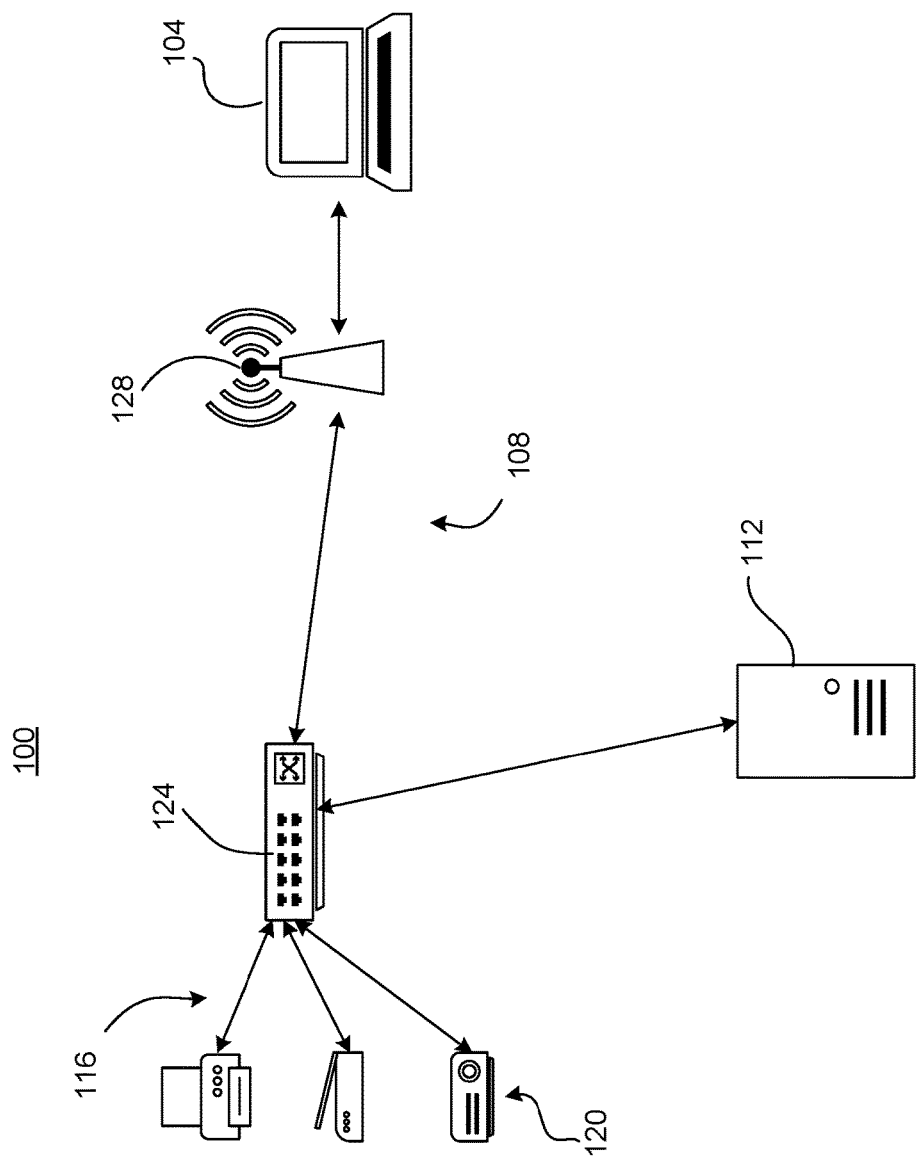
FIG. 1 depicts components of a system for selecting and delivering content in accordance with embodiments of the present disclosure.

FIG. 1 illustrates a system 100 in accordance with embodiments of the present disclosure that enables a user device 104 to be selectively connected to a peripheral device 120. More particularly, the system 100 enables ad hoc virtual networks or connections to be created between user devices 104 and peripheral devices 120, and further allows those virtual networks or connections to be torn down or discontinued, conveniently, and while maintaining desired levels of security and limitations on unauthorized access.

In general, the system 100 includes one or more user devices 104, a first or user facing network 108, a communication server or network controller server 112, a second or facility infrastructure network 116, and one or more peripheral devices 120. In addition, the system can include one or more switches, routers or firewalls, hereinafter referred to simply as a switch 124, and one or more access points 128.

In accordance with at least some embodiments of the present disclosure, a user device 104 may comprise a portable or mobile device. Examples of user devices 104 include, but are not limited to, smart phones, tablet computers, laptop computers, or any other devices that are capable of supporting the presentation of credentials to and communications with the communication server 112 and/or one or more peripheral devices 120 over a network 108. A user device 104 is typically connected to the first network 108, which is in turn connected to the switch 124 and the communication server 112.

A peripheral device 120 can be any device to which a user device 104 can be operatively connected, either directly or through an intermediate device or node. Examples of peripheral devices 120 include but are not limited to printers, projectors, CD/DVD drives, hard disk drives, network attached storage devices, and scanners. In accordance with still other embodiments of the present disclosure, a peripheral device 120 can include a shared location in a memory or data storage. A peripheral device 120 is typically connected to the second network 116, which is connected to the switch 124 and the communication server 112 directly or through an intermediate connection or network.

The visibility of a peripheral device 120 to a user device 104 is controlled by the communication server 112. In particular, as discussed in greater detail elsewhere herein, the peripheral devices 120 may be implemented on a network 116 that is not directly accessible to a user device 104. Accordingly, where a user device 104 is operably connected to a peripheral device 120, that connection is enabled by the communication server 112.

The first network 108 may comprise a local area network or a wide area network. An example of a first network 108 is a network associated with a hotel or other hospitality facility that includes a Wi-Fi network, a wired Ethernet network, or any other network technology. Alternatively or in addition, the first network 108 can include the Internet, a cellular data network, or the like. In general, the first network 108 is operable to place a user device 104 in communication with the communication server 112. Furthermore, the first network 108 can support a connection between a user device 104 and a peripheral device 120 that is enabled by the communication server 112. In accordance with at least some embodiments of the present invention, the first network 108 includes one or more access points 128 and other network devices, including, but not limited to, network media, switches, routers, and/or firewalls. The first network 108 can be a publicly available network, or it can be made available to user devices 104 on a limited basis.

The second or facility network 116 can include, for example, but without limitation, an on-premises network. In general, the second network 116 is not directly accessible to a user device 104. Instead, the communication server 112 selectively enables the user device 104 to make use of at least portions of the second network 116 by selectively enabling connections between the user device 104 and a peripheral device 120.

Figure 2:
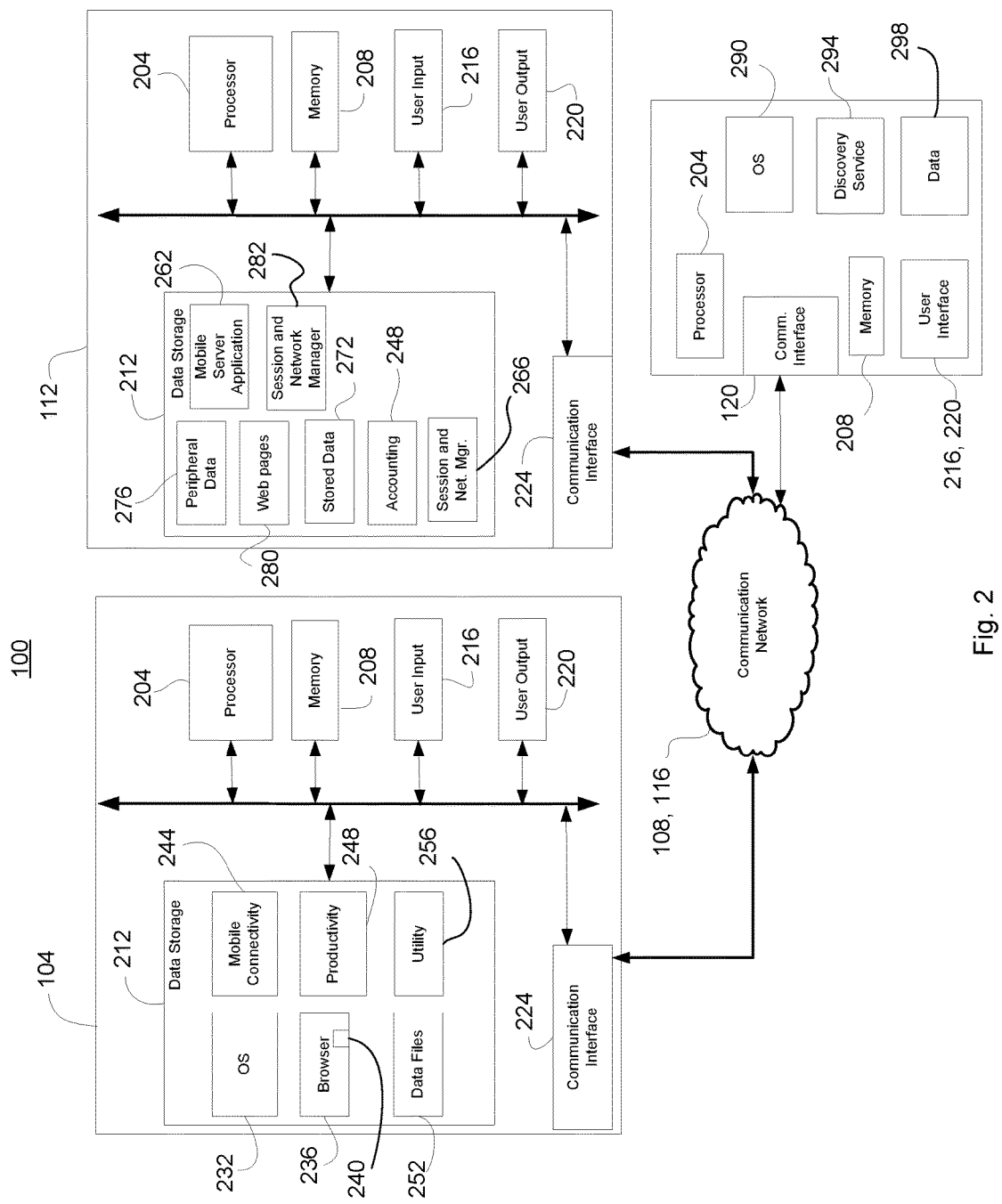
FIG. 2 is a block diagram depicting components of a system for selecting and delivering content; using a system as depicted in FIG. 1.

With reference now to FIG. 2, additional aspects and components of a system 100 in accordance with embodiments of the present invention are depicted. Each user device 104, communication server 112, and peripheral device 120 can include a processor 204 and memory 208. The processor 204 may comprise a general purpose programmable processor or controller for executing application programming or instructions. As a further example, the processor 204 may comprise a specially configured application specific integrated circuit (ASIC). The processor 204 generally functions to run programming code or instructions, such as applications or programs, implementing various functions of the associated device or node 104, 112 or 120. As can be appreciated by one of skill in the art after consideration of the present disclosure, different devices 104, 112 or 120 will typically have different processors 204, depending on the functions and capabilities of the associated device 104, 112 or 120. The memory 208 is generally used in connection with the execution of application programming by the processor 204, and for the temporary or long term storage of program instructions and/or data. As examples, the memory 208 may comprise removable secure digital storage, RAM, SDRAM, or other solid state memory. Moreover, some or all of the memory 208 may be integral to the processor 204.

A device 104, 112 or 120 can also include data storage 212. In accordance with embodiments of the present invention, data storage 212 can contain program code or instructions implementing various applications or functions executed by the associated device 104, 112 or 120. Like the memory 208, the data storage 212 can comprise a solid state memory device. In addition, in certain applications, the data storage 212 can be integrated with and/or indistinguishable from the memory 208, for instance on certain mobile devices 112. Alternatively or in addition, the data storage 212 may comprise a hard disk drive or other random access memory, and can be integral to the associated device 104, 112 or 120, or can be interconnected to the device, for example as network attached storage.

A device or node 104, 112 or 120 can also be associated with one or more user input devices 216. Examples of user input devices 216 can include keyboards, touch screen displays, position encoders such as a touchpad, mouse, or track ball, associated with a display, switches, or any other device capable of receiving input from a user 116. In addition, a device 104, 112 or 120 can be associated with one or more user output devices 220. Examples of user output devices 220 include displays, speakers, and indicator lamps.

In addition, each node 104, 112 or 120 can include one or more communication interfaces 224. As examples, a communication interface 224 can include an interface to a wireline or wireless carrier network, including but not limited to a cellular network, the public switched telephony network (PSTN), a satellite telephony network, or a wireline or wireless Internet protocol network, such as Ethernet, Wi-Fi, or Bluetooth interfaces. Moreover, different devices 104, 112, or 120 can have different communication interfaces 224 or sets of communication interfaces 224.

Devices 104, 112 or 120 of a system 100 can be associated with different applications or application programming. These different applications can be stored in the data storage 212 of the associated node 104, 112 or 120.

For instance, in the case of a user device 104, application programming can include an operating system 232, a browser 236, a browser plug-in 240, a mobile connectivity application 244, a productivity application 248, such as a word processor, spreadsheet, presentation program, document viewer, or other application, data files 252, and utilities 256. Through operation of one or more of the applications, the user device can present a user interface, such as a graphical user interface (GUI), that enables the user to perform different actions, such as joining the user device 104 to the network 108 and/or to a peripheral device 120. For example, the user device 104 may present a GUI to a user through an installed program. In accordance with embodiments of the present disclosure, the user device 104 may establish a connection with a limited access first network 108, and/or obtain or demonstrate rights to utilize one or more peripheral devices 120, by interacting with the communication server 112 through an installed application.

The communication server 112 may comprise a communications server located at or in the vicinity of the site at which a user device 104 and a peripheral device 120 are located. Moreover, the communication server 112 can be directly connected to the first network 108 and/or the second network 116. Alternatively, the communication server 112 may be placed at a location that is remote from the user device 104 and the peripheral device 120. In accordance with at least some embodiments of the present disclosure, the communication server 112 can include a user device server application 262. The user device server application 262 can respond to requests for pairing codes and/or otherwise authorize a user device 104 to connect to the first network 108, and to access resources, such as peripheral devices 120, on the second network 116. In accordance with other embodiments, the user device server application 262 functions may be implemented by another network node (e.g., another system server) or its function can be implemented across a number of different network nodes. In at least some embodiments, the user device server application 262 may establish pairing relationships between a user device 104 and a peripheral device 120.

In accordance with at least some embodiments of the present disclosure, the communication server 112 provides session and network manager services 266. The session and network manager services 266 operates to control the set of peripheral devices 120 that are visible to a user device 104 seeking access to or use of a peripheral device 120. The functions of the session and network manager services 266 can also include responding to requests from a user device 104 to pair with a peripheral device 120 in connection with the delivery of content. In other embodiments, the session and network manager services 266 can register the user device 104 with the communication server 112, the local content distribution network 118, and/or a specific peripheral device 120. Alternatively, registration may be performed by an administrative server that is separate from the communication server 112. The session and network manager services 266 can also control the advertisement and discovery of peripheral devices 120 with respect to user devices 104, can route and control multicast domain name system (mDNS) messages passed from or between peripheral devices 120 and user devices 104, can implement a virtual discovery and launch (DIAL) server, can route network traffic on behalf of a user device 104 from a content provider 124 to a peripheral device 120, can route control inputs entered at a user device 104 to a virtual player 132, and/or can route selection and control inputs entered at a user device 104 to a content provider 124, as described in further detail elsewhere herein. In accordance with embodiments of the present disclosure, the communication server 112 operates to enable and control the establishment of connections between a user device 104 and a peripheral device 120. Moreover, such connections are enabled and controlled even where the user device 104 and the peripheral device 120 are on separate networks or subnetworks.

The communication server 112 can store or maintain various applications and/or data in associated data storage 212. For example, stored data 272, can include information regarding registered or paired user devices 104. In addition, device identifiers, configuration, and status information related to peripheral devices 120 can be stored as peripheral data 276. In accordance with at least some embodiments of the present disclosure, peripheral data 276 can include drivers that can be provided to a user device 104, or that can be executed on behalf of a user device 104, in connection with enabling a user device 104 to make use of a peripheral device 120. In accordance with still other embodiments of the present disclosure, the communication server 112 can store web pages 280 that are served to the browser of a user device 104 as a landing page for a user device 104, and/or to implement a pay wall with respect to access to peripheral devices 120 or other resources. Still other data that can be stored on the communication server is accounting data 248, which can include tallies of activities performed by user devices 104 with respect to peripheral devices 120 that are associated with charges, and lodging information 286, which can associate user devices 104 with certain permissions or peripheral devices 120.

Examples of application programming and content that can be stored in the data storage 212 associated with a peripheral device 120 includes operating software and firmware 290, and a discovery service routine or software 294. In accordance with embodiments of the present disclosure, the discovery service routine or software can implement networking protocols that permit devices to discover and connect to the associated peripheral device, such as mDNS, DIAL, Universal Plug and Play (UPnP), or Digital Living Network Alliance (DLNA) protocols. The data storage 212 of the peripheral device 120 also provide temporary storage for data 298, such as files provided from a user device 104 for handling.

Figure 3:
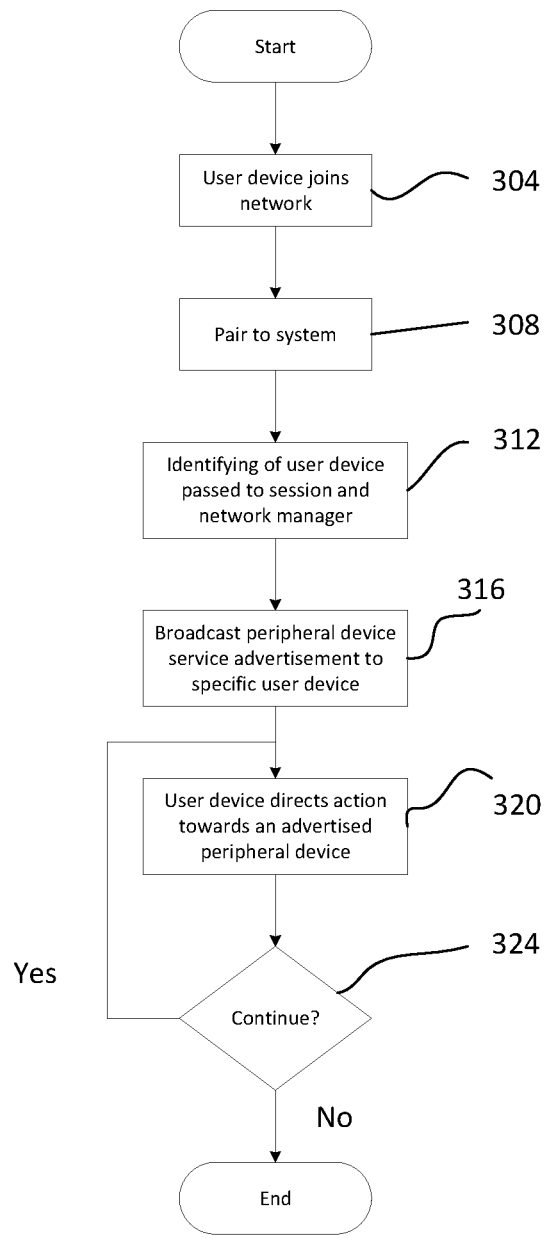
FIG. 3 depicts a process for selecting and delivering content using a system as depicted in FIGS. 1-2.

With reference now to FIG. 3, aspects of the operation of a system for selecting and delivering content 100a are depicted. Initially, at step 304, a user device 104 joins the first network 108. In accordance with an exemplary embodiment of the present disclosure, the first network 108 may comprise a hotel Wi-Fi network, in which case joining the first network 108 can include establishing a connection to a network access point 109 and providing credentials or authorization, such as a user name and password. Next, at step 308, the user can pair the user device 104 to a the system 100 using a pairing process. Pairing can involve establishing a relationship between a particular user device 104 and a particular peripheral device or set of peripheral devices 120. Alternatively or in addition, pairing can include registering the user device 104 with the communication server 112, with or without associating the user device 104 with a particular peripheral device 120. In accordance with further embodiments of the present disclosure, the user device 104 can include a request for access to an identified peripheral device 120 or type of peripheral device 120 as part of or following the pairing process. Pairing can be accomplished using any of various techniques. For instance, the user of a user device 104 can operate a browser 236 or a mobile connectivity application 244 on the user device 104 that places the user device 104 and communication with the communication server 112. The user can then provide identifying information, a pairing code, credentials, authentication information, or other information to the communication server 112 to validate or support the requested pairing relationship. Examples of techniques that can be used to accomplish pairing are disclosed in U.S. patent application publication number 2012/0324076 and U.S. patent application publication number 2012/0322384, the entire disclosures of which are incorporated herein by reference in their entirety. In accordance with further embodiments, pairing or registering the user device 104 with the communication server 112 can be performed when a user checks in as a guest of a hospitality facility. At step 312, the IP address, MAC address, and/or other information identifying the user device 104 is passed to the session and network manager 266 as part of the pairing process. When necessary, standard protocols, such as the address resolution protocol (ARP), are used to determine any required information not related to the unique identifier, but not explicitly passed. Thus, in accordance with the least some embodiments of the present disclosure, a user device 104 is effectively registered with the communication server 112 as part of the pairing process.

In response to registering the user device 104 to the communication server 112 and to receiving a request for access to a peripheral device 120, the session and network manager 266 running on the communication server 112 and implementing a discovery service function starts broadcasting a device advertisement to the user device 104 IP address (step 316). Therefore, in accordance with at least some embodiments of the present disclosure, the communication server 112, and in particular the session and network manager 128, directs one or more discovery service advertisements to the paired user device 104 IP address, rather than allowing the advertisement to be broadcast to any device on the first network 108. Alternatively, the communication server 112 can direct one or more peripheral devices 120 to send a discovery service advertisement to the user device 104 address. The advertisement can be related to a peripheral device 120 requested by the user device 104, a user device selected by the communication server 112, or a set of peripheral devices 120 selected by the communication server 112. Accordingly, the communication server exercises control over the peripheral devices 120 that are made visible to the user device 104, and enables peripheral devices 120 on a different network or subnetwork from the user device 104 to be discovered by the user device 104. In addition, because the communication server 112 controls which peripheral devices 120 are visible to the user device 104, use restrictions with respect to peripheral devices 120 can be enforced.

The user of the user device 104 can then direct an action towards an advertised peripheral device 120 (step 320). For example, a document can be sent from a productivity application 248 on the user device to a peripheral device 120 for printing. As another example, a document can be sent from a productivity application 248 to a peripheral device 120 for storage. As yet another example, a browser 236 or productivity application 248 can retrieve a file stored on a peripheral device 120. Once action is taken by a user device 104 with respect to a peripheral device 120, or once a peripheral device 120 is selected through an input passed from the user device 104 to the peripheral device 120 and/or the session and network manager 282, the communication server 112 can reserve that peripheral device 120 to the associated user device.

At step 324, a determination can be made as to whether the relationship between the user device 104 and the peripheral device should be discontinued. For example, a user device 104 might disconnect from the system 100, or the communication server 112 might terminate use, for instance by blocking communications between the user device 104 and the peripheral device 120, where use might have expired or where another user device 104 has been granted access to the peripheral device 120. If use is to continue, the process can return to step 320. Otherwise, the process may end.

In accordance with embodiments of the present disclosure, the peripheral device 120 advertisement that is sent in response to a request or search for services by a user device 104 is specifically directed to the user device 104 that sent the query, rather than being broadcast to, for example, all of the user devices 104 connected to the first network 108. For example, communication server 112 may direct to the response to a specific user device 104 using the MAC address, IP address, or other identifier of the user device 104. Moreover, embodiments of the present disclosure do not require that the user device 104 and the peripheral device 120 be on the same sub-network or network. Indeed, in various exemplary embodiments disclosed herein, the user device 104 and the peripheral device 120 operated in connection with the user device 104 are on different networks. The peripheral devices 120 offered by the communication server 112 through operation of the session and network manager 282 may be limited to the peripheral device or devices 120 in the immediate vicinity of the user device 104. Moreover, information regarding appropriate peripheral devices 120 to be offered to the user device 104 may be obtained as part of the pairing process. For example, in a conference or convention environment, a user device 104 associated with a conference presenter may be provided with a list of peripheral devices 120 comprising projectors located in a meeting room assigned to a particular conference event. Moreover, multiple peripheral devices 120 can be selected simultaneously, for example where the room has multiple projectors. As another example, a single user device 104 can be granted simultaneous access to different types of peripheral devices 120. As yet another example, multiple user devices 104 may be granted simultaneous access to a peripheral device 120 that is to be shared among plurality of users, such as a printer or a storage device being used as a shared repository for presentation documents. In still other embodiments, use of a selected peripheral device 120 by a single user device 104 can be enforced by the communication server 112 to ensure confidentiality.

Moreover, access by a user device 104 to a peripheral device 120 can be controlled by the communication server 112 based on various rules and conditions, such as authorization, payment, location, or the like. In addition, per use charges can be accumulated and accounted for by accounting software 248 running on the communication server 112.

Accordingly, embodiments of the present disclosure allow peripheral devices 120 on one network to be discovered by user devices 104 on another network by providing a communication server 112 that operates to bridge the two networks. In addition, the communication server 112 can enforce use restrictions by constraining the set of peripheral devices that are visible to the user devices 104. The communication server can also enforce payment of charges associated with use of peripheral devices 120 by client devices.

The contents of this disclosure may have the following configurations:

(1)

A system for selectively enabling connections between devices, comprising:
a communication server;
a user device;
a first network, wherein the communication server and the user device are connected to the first network;
a plurality of peripheral devices;
a second network, wherein the peripheral devices are connected to the communication server through the second network, and wherein the communication server is operable to make at least one and less than all of the peripheral devices visible to the user device.

(2)

The system of (1), wherein the user device is operably connected to the at least one of the peripheral devices by the communication server.

(3)

The system of (1) to (2), further comprising: a switch, wherein the first and second networks are connected through the switch.

(4)

The system of any of (1) to (3), further comprising: an access point, wherein the user device is connected to the first network by the access point.

(5)

The system of (4), wherein the access point is a WiFi access point.

(6)

The system of any of (1) to (6), wherein the at least one of the peripheral devices is connected to the second network by a wireline connection.

(7)

The system of any of (1) to (6), wherein the user device is one of a smart phone, a tablet computer, and a laptop computer.

(8)

The system of any of (1) to (7), wherein the at least one of the peripheral devices is a printer.

(9)

The system of any of (1) to (7), wherein the at least one of the peripheral devices is a disk drive.

(10)

The system of any of (1) to (7), wherein the at least one of the peripheral devices is a data storage device.

(11)

The system of any of (1) to (7), wherein the at least one of the peripheral devices is a projector.

(12)

The system of any of (1) to (11), further comprising:
a plurality of user devices, wherein the communication server makes a first set of peripheral devices visible to a first user device in the plurality of user devices, and
wherein the communication server makes a second set of peripheral devices visible to a second user device in the plurality of user devices.

(13)

The system of (12), wherein none of the peripheral devices in the first set of peripheral devices is included in the second set of peripheral devices.

(14)

The system of any of (1) to (13), wherein the user device is operably connected to a peripheral device that is visible to the user device, wherein content is provided to the peripheral device that is operably connected to the user device, and wherein the content provided to the peripheral device is output by a peripheral device operably connected to the peripheral device.

(15)

The system of any of (1) to (14), wherein the user device includes a productivity application, wherein a document open in the productivity application is provided to the peripheral device that is visible to the user device.

(16)

A method, comprising:
providing a communication server;
providing a first access point, wherein the first access point is connected to the communication server by a first network;
providing a plurality of peripheral devices, wherein the plurality of peripheral devices include a first peripheral device, wherein the first peripheral device is operatively connected to the first access point through a second network;
providing a plurality of peripheral devices;
receiving a request to pair a user device to a peripheral device included in the plurality of peripheral devices;
in response to the request, the communication server causing a discovery response to be sent to the user device indicating the availability of at least a first peripheral device included in the plurality of peripheral devices;
receiving a request from the user device to operatively connect to the first peripheral device;
sending an acknowledgment to the request from the first peripheral device to the user device.

(17)

The method of (16), wherein the response sent to the user device indicating the availability of at least a first peripheral device is received by a productivity application running on the user device.

(18)

The method of (17), wherein a document is delivered from the productivity application to be output by the first peripheral device.

(19)

The method of any of (16) to (18), wherein the first peripheral device is a printer, and wherein the device is presented by the communication server.

(20)

A system for selectively connecting user devices to peripheral devices, comprising:
a communication server;
a plurality of user devices;
a plurality of access points, wherein each of the user devices is connected to one of the access points;
a first network, wherein the access points and the communication server are connected to the first network, and wherein the user devices are connected to the first network through the access point;
a second network;
a plurality of peripheral devices, wherein the communication server is operable to make a first peripheral device included in the plurality of peripheral devices selectively visible to the user devices, wherein a first peripheral device is visible to a first user device, wherein a second peripheral device is visible to a second user device, wherein the second peripheral device is not visible to the first user device, and wherein the first peripheral device is not visible to the first user device.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A system for selectively enabling connections between devices, comprising:
    a communication server;
    a plurality of user devices, the plurality of user devices including at least a first user device and a second user device;
    a first network, wherein the communication server and the first and second user devices are connected to the first network;
    a plurality of peripheral devices;
    a second network, wherein the peripheral devices are connected to the communication server through the second network,
    wherein the second network is not directly accessible to the user devices;
    wherein the communication server is operable to make a first set of the peripheral devices visible to the first user device by directing discovery service advertisements for the first set of peripheral device to an address of the first user device based on a pairing between the first user device and at least one of the communication server or a first peripheral device included in the first set of peripheral devices,
    wherein the communication server is operable to make a second set of the peripheral devices visible to the second user device by directing discovery service advertisements for the second set of the peripheral devices to an address of the second user device based on a pairing between the second user device and at least one of the communication server or a second peripheral device included in the second set of peripheral devices, and
    wherein the first set of peripheral devices is different than the second set of peripheral devices.

2. The system of claim 1, wherein the user device is operably connected to the at least one of the peripheral devices by the communication server.

3. The system of claim 1, further comprising:
    a switch, wherein the first and second networks are connected through the switch.

4. The system of claim 3, further comprising:
    an access point, wherein the user device is connected to the first network by the access point.

5. The system of claim 4, wherein the access point is a WiFi access point.

6. The system of claim 3, wherein at least one of the peripheral devices included in the first set of peripheral devices is connected to the second network by a wireline connection.

7. The system of claim 1, wherein the user device is one of a smart phone, a tablet computer, and a laptop computer.

8. The system of claim 1, wherein at least one of the peripheral devices included in the first set of peripheral devices is a printer.

9. The system of claim 1, wherein at least one of the peripheral devices included in the first set of peripheral devices is a disk drive.

10. The system of claim 1, wherein at least one of the peripheral devices included in the first set of peripheral devices is a data storage device.

11. The system of claim 1, wherein at least one of the peripheral devices included in the first set of peripheral devices is a projector.

12. The system of claim 1, wherein none of the peripheral devices in the first set of peripheral devices is included in the second set of peripheral devices.

13. The system of claim 1, wherein the first user device is operably connected to a peripheral device that is made visible to the first user device, wherein content is provided to the peripheral device that is operably connected to the first user device, and wherein the content provided to the peripheral device is output by the peripheral device.

14. The system of claim 13, wherein the first user device includes a productivity application, wherein a document open in the productivity application is provided to the peripheral device that is visible to the user device.

15. A method, comprising:
    providing a communication server;
    providing a first access point, wherein the first access point is connected to the communication server by a first network;
    providing a plurality of peripheral devices, wherein the peripheral devices are operatively connected to the first access point through a second network, and wherein the peripheral devices are not directly accessible by user devices;

receiving at the communication server a request from a first user device to join the first network;

in response to the request from the first user device, registering the first user device with the communication server;

receiving at the communication server a request from the first user device to access a peripheral device included in the plurality of peripheral devices;

in response to the request from the first user device to access a peripheral device, the communication server causing a discovery service advertisement to be sent to an address of the first user device indicating the availability of at least a first peripheral device included in the plurality of peripheral devices;

receiving at the communication server a request from a second user device to join the first network;

in response to the request from the second user device, registering the second user device with the communication server;

receiving at the communication server a request from the second user device to access another peripheral device included in the plurality of peripheral devices; and in response to the request from the second user device to access a peripheral device, the communication server causing a discovery service advertisement to be sent to an address of the second user device indicating the availability of at least a second peripheral device included in the plurality of peripheral devices.

16. The method of claim 15, wherein the response sent to the user device indicating the availability of at least a first peripheral device is received by a productivity application running on the user device.

17. The method of claim 16, wherein a document is delivered from the productivity application to be output by the first peripheral device.

18. The method of claim 17, wherein the first peripheral device is a printer, and wherein the device is presented by the communication server.

19. A system for selectively connecting user devices to peripheral devices, comprising:

a communication server;

a plurality of user devices, the plurality of user devices including at least a first user device and a second user device;

a plurality of access points, wherein each of the user devices is connected to one of the access points;

a first network, wherein the access points and the communication server are connected to the first network, and wherein the user devices are connected to the first network through the access point;

a second network;

a plurality of peripheral devices, wherein the communication server is operable to make a first peripheral device included in the plurality of peripheral devices selectively visible to the user devices through discovery service advertisements, wherein a first user device is registered with the communication server and is associated with a first user credential, wherein a second user device is registered with the communication server and is associated with a second user credential, wherein a first peripheral device is visible to a first user device through a first discovery service advertisement directed to an address of the first user device, wherein the first peripheral device is selected based on the first user credential, wherein a second peripheral device is visible to a second user device through a second discovery service advertisement directed to an address of the second user device, wherein the second peripheral device is selected based on the second user credential, wherein the second peripheral device is not visible to the first user device, and wherein the first peripheral device is not visible to the second user device.

* * * * *